United States Patent
Kawamata et al.

(10) Patent No.: US 10,077,817 B2
(45) Date of Patent: Sep. 18, 2018

(54) CALIPER FOR DISC BRAKES

(71) Applicant: NIPPON LIGHT METAL COMPANY, LTD., Tokyo (JP)

(72) Inventors: Takahiro Kawamata, Nagano (JP); Tetsuzo Nishimura, Nagano (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/407,761

(22) Filed: Jan. 17, 2017

(65) Prior Publication Data

US 2017/0122389 A1    May 4, 2017

Related U.S. Application Data

(63) Continuation of application No. 14/420,116, filed as application No. PCT/JP2012/070527 on Aug. 10, 2012, now Pat. No. 9,599,175.

(51) Int. Cl.
*B22C 9/10* (2006.01)
*B22C 9/22* (2006.01)
(Continued)

(52) U.S. Cl.
CPC .......... *F16D 65/0068* (2013.01); *B22C 9/108* (2013.01); *B22C 9/22* (2013.01);
(Continued)

(58) Field of Classification Search
CPC .. B22C 9/10; B22C 9/108; B22C 9/22; B22D 25/02; B22D 29/00; B22D 29/001
(Continued)

(56) References Cited

U.S. PATENT DOCUMENTS 2,256,516 A    9/1941  Carlin
5,168,964 A *  12/1992 Shimmell ............. F16D 55/226
                                                      164/98
(Continued)

FOREIGN PATENT DOCUMENTS

JP    2007-010136    1/2007
JP    2009-174569    8/2009
(Continued)

OTHER PUBLICATIONS

International Search Report for PCT/JP2012/070527 dated Oct. 16, 2012, along with an English-language translation thereof.
Extended European Search Report for Appl. No. EP 12882797.9 dated Mar. 11, 2016.

*Primary Examiner* — Kevin P Kerns
(74) *Attorney, Agent, or Firm* — Greenblum & Bernstein, P.L.C.

(57) ABSTRACT

A caliper includes a hydraulic linking channel provided in a bridge section linking hydraulic cylinders, on an inner caliper section side, and hydraulic cylinders, on an outer caliper section side, to a cylinder-side hydraulic channel disposed on the back end of each respectively. A connecting channel forming section, which corresponds to each cylinder-side hydraulic channel and the hydraulic linking channel is provided, in advance, in a core used during casting of the inner caliper section, the outer caliper section, and the bridge section, and is formed by setting in a situation to be embedded at the same time as each caliper section and the bridge section are being integrally cast.

4 Claims, 19 Drawing Sheets

(51) Int. Cl.
  *B22D 25/02*    (2006.01)
  *B22D 29/00*    (2006.01)
  *F16D 65/00*    (2006.01)
  *F16D 55/228*   (2006.01)
  *F16D 55/225*   (2006.01)
  *F16D 55/00*    (2006.01)
  *F16D 125/16*   (2012.01)
  *F16D 121/04*   (2012.01)
  *F16D 55/22*    (2006.01)

(52) U.S. Cl.
  CPC ............ *B22D 25/02* (2013.01); *B22D 29/001* (2013.01); *F16D 55/225* (2013.01); *F16D 55/228* (2013.01); *F16D 55/22* (2013.01); *F16D 2055/0016* (2013.01); *F16D 2055/0091* (2013.01); *F16D 2121/04* (2013.01); *F16D 2125/16* (2013.01); *F16D 2200/003* (2013.01); *F16D 2250/0015* (2013.01)

(58) Field of Classification Search
  USPC .......................................... 164/30, 137, 369
  See application file for complete search history.

(56) References Cited

U.S. PATENT DOCUMENTS

| | | | |
|---|---|---|---|
| 5,518,062 | A * | 5/1996 | Kobayashi et al. ...... B22C 9/10 164/137 |
| 5,853,071 | A | 12/1998 | Robinson |
| 6,367,595 | B1 | 4/2002 | Mori et al. |
| 7,232,015 | B1 * | 6/2007 | Umehara et al. ..... F16D 55/226 148/538 |
| 9,599,175 | B2 * | 3/2017 | Kawamata et al. .. F16D 55/228 |
| 2001/0008182 | A1 * | 7/2001 | Sugita et al. ............. B22C 9/06 164/112 |
| 2006/0175156 | A1 | 8/2006 | Sato et al. |
| 2008/0289916 | A1 | 11/2008 | Sato et al. |
| 2010/0096223 | A1 | 4/2010 | Itsuaki et al. |

FOREIGN PATENT DOCUMENTS

| | | |
|---|---|---|
| JP | 2009-275856 | 11/2009 |
| JP | 2010-101342 | 5/2010 |
| WO | 2007/000780 | 1/2007 |
| WO | 2007/077206 | 7/2007 |
| WO | 2013/105010 | 7/2013 |

* cited by examiner ns the present invention relates to a caliper for disc brakes.
CALIPER FOR DISC BRAKES

CROSS REFERENCE TO RELATED APPLICATION

This is a continuation application of U.S. Pat. No. 9,599,175 filed on Feb. 6, 2015, which is a National Stage of International Application No. PCT/JP2012/070527 which was filed on Aug. 10, 2012, the disclosures of which are expressly incorporated herein by reference in their entireties.

TECHNICAL FIELD

The present invention relates to a caliper for disc brakes. More specifically, the present invention relates to a disc brake caliper used for vehicles and the like, which brakes a disc rotor by moving forward pistons disposed by opposing to each other on both side faces of the disc rotor by oil pressure and having pads provided integrally at tip ends of the pistons pressed against the both side faces of the disc rotor.

BACKGROUND ART

In order to brake automobiles, disc brakes are used widely.

The braking of automobiles by the disc brake is executed by pressing a pair of pads, which are disposed on the both sides in the axial direction of the disc rotor that rotates along with a wheel, against the both sides of the disc rotor by moving forward the piston inserted in a cylinder by oil pressure.

In such disc brake, cylinders provided to an inner caliper section and an outer caliper section, respectively, are connected via an oil channel provided inside a caliper body. Regarding such oil channel inside the caliper body, known is a structure where the oil channel is provided by molding by using a core (e.g., see Patent Document 1).

A piston-opposed type disc brake disclosed in Patent Document 1, as shown in FIGS. 18 and 19, an inner caliper section 102 and an outer caliper section 103 arranged in an opposing manner in a caliper body 101 are linked via a bridge section 104 that crosses over a disc rotor D. Further, the inner caliper section 102, the outer caliper section 103, and the bridge section 104 are formed integrally through casting by using aluminum or an aluminum alloy as a material thereof.

Two each of cylinders 105 and 105 are formed in the inner caliper section 102 and the outer caliper section 103, respectively, and pistons 106 and 106 are inserted to each of the cylinders 105 and 105, respectively, in a liquid-dense manner.

A window hole 108 is provided to the caliper body 101, and brake pads 107 to be slid against the disc rotor D by being pressed by the pistons 106, 106 are provided in the window hole 108 in a freely slidable manner in the direction along the disc axis.

Further, an inner-side cylinder connecting oil channel 110A and an outer-side cylinder connecting oil channel 110B extended towards the outer side of the radius direction of the disc rotor D for connecting between the inner bottom parts of each of the cylinders 105 and 105 are provided to the inner caliper section 102 and the outer caliper section 103, respectively.

Further, those cylinder connecting oil channels 110A and 110B are formed by using a decay core when casting the caliper body 101.

Further, a hydraulic linking channel 113 in the disc axial direction is provided to the bridge section 104 of the caliper body 101. A bleeder hole 114 that is coaxial with the hydraulic linking channel 113 is formed at the end part of the hydraulic linking channel 113 on the inner caliper 102 side, and an air bleeder 115 is screwed into the bleeder hole 114. Thus, the bleeder hole 114 is blocked.

The piston-opposed type disc brake is in the structure described above, so that each of the brake pads 107, 107 is pressed against the both side faces of the disc rotor D when the pistons 106, 106 are pressurized to the disc rotor D side via an oil pressure at the time of operation.

As a result, the pressurizing force of the brake pads 107, 107 works as the braking force for the vehicle axle, thereby decreasing the rotating speed of the vehicle axle or stopping it. That is, the brake comes in effect.

Patent Document 1: Japanese Unexamined Patent Publication 2010-101342

However, there are following issues with the existing technique described above.

That is, the cylinder connecting oil channels 110A, 110B formed to each of the inner caliper section 102 and the outer caliper section 103 are formed with a core placed inside the mold cavity at the time of manufacturing the caliper body 101, while the hydraulic linking channel 113 connecting between those cylinder connection oil channels 110A and 110B is opened by performing drill processing from the outer surface part of the inner caliper section 102, for example, after casting the caliper body 101.

However, the processing of the hydraulic linking channel 113 by drilling needs to open the hole of small diameter, and the hole opening processing is executed from the inner caliper section 102 through the outer caliper section 103 so that the processing length becomes long. As a result, the drill may be warped depending on the moving speed of the drill. Therefore, the processing is difficult and the processing precision may become poor, so that the yield is deteriorated as well.

Further, the processing of the hydraulic linking channel 113 by the drill is required to securely connect the end parts of each of the two cylinder connecting oil channels 110A and 110B which are located at positions that cannot be visually recognized from the outer surface part of the inner caliper section 102, so that the direction of the drill and the start position for opening the hole need to be determined surely. Therefore, it takes a long time to start up the hole opening processing.

Further, the processing of the hydraulic linking channel 113 needs to open the hole of small diameter and the processing length is long, so that it is required to advances the drill carefully. Thus, the processing time becomes long, thereby deteriorating the productivity. As a result, the cost performance becomes poor.

Further, even when the hydraulic linking channel 113 and the cylinder connecting oil channels 110A, 110B are connected in the above-described work, it is not possible to judge that the hydraulic linking channel 113 and the cylinder connecting oil channels 110A, 110B are connected in a 100% state. Supposing that a part of the channel 113 and a part of the channels 110A, 110B are connected, it is possible to check that those are linked by blowing air, for example. However, it is not possible to judge whether or not those are linked in a 100% state. If so, it is necessary to check whether or not the oil pressure is uniformly applied to the cylinders 105 of the inner caliper section 102 and the outer caliper section 103 through operating the pistons 106 by actually applying the oil pressure to the cylinders 105 to which the pistons 106 are mounted.

Further, in a case where the oil pressure is not applied uniformly to the cylinders 105 of each of the caliper sections 102 and 103, braking becomes unstable and uneven wear and the like of the brake pads 107 occur, thereby producing an inferior piece. Only after executing the work theretofore, the judgment regarding whether or not the caliper body 101 can be used as a product can be made finally. Therefore, it takes a lot of effort and time, so that the cost performance in regards to those is poor as well.

The present invention is designed to overcome the issues described above. More specifically, it is an object of the present invention to provide a caliper for disc brakes, which is capable of securely placing a hydraulic linking channel inside a bridge section which mutually links an inner caliper section and an outer caliper section without depending on machining.

DISCLOSURE OF THE INVENTION

In order to achieve the foregoing object, the caliper for disc brakes according to the present invention includes: an inner caliper section and an outer caliper section which are disposed by opposing to each other by sandwiching a disc rotor therebetween and both ends thereof in length directions are linked integrally via a bridge section; and pressurizing piston hydraulic cylinders which are provided to respective opposing surface regions of the inner caliper section and the outer caliper section and simultaneously pressurize the disc rotor from both surfaces thereof via brake pads when in an action, wherein:

the hydraulic cylinder on the inner caliper section side and the hydraulic cylinder on the outer caliper side are linked by cylinder-side hydraulic channels provided on respective back face sides and a hydraulic linking channel provided inside the bridge section; and each of the cylinder-side hydraulic channels and the hydraulic linking channel are set to be in a state embedded simultaneously in each of the caliper sections and the bridge section when integrally casting-molding each of the caliper sections and the bridge section through providing a connecting channel forming section corresponding to each of the cylinder-side hydraulic channels and the hydraulic linking channel in advance in a core used when casting-molding the inner caliper section, the outer caliper section, and the bridge section.

With the disc brake caliper according to the present invention, the hydraulic cylinders of the inner caliper section and the outer caliper section can be linked by the cylinder-side hydraulic channels via the bridge section and the hydraulic linking channel that links those cylinder-side hydraulic channels can be molded integrally simultaneously with the cylinder-side hydraulic channels. As a result, it is unnecessary to perform processing for forming a hole with a drill after casting, i.e., to perform machining, to make the hydraulic linking channel for linking the cylinder-side hydraulic channels provided to the inner caliper section and the outer caliper section. Thus, the above-described effort made for the processing is lightened, thereby making it possible to improve the productivity greatly.

Further, since the cylinder-side hydraulic channels and the hydraulic linking channel are molded integrally with a core simultaneously at the time of casting, position shift in hole processing generated at the time of executing the hole processing can be avoided. As a result, the oil pressure works on each of the hydraulic cylinders of the inner caliper section and the outer caliper section uniformly at the time of using the caliper, so that stable braking can be expected and there is no issue of uneven wear and the like generated in the brake pads. As a result, the life of the brake pads can be extended.

BEST MODES FOR CARRYING OUT THE INVENTION

Hereinafter, an embodiment of a caliper for disc brakes according to the embodiment will be described in details by referring to FIGS. 1 to 16.

Figure 1:
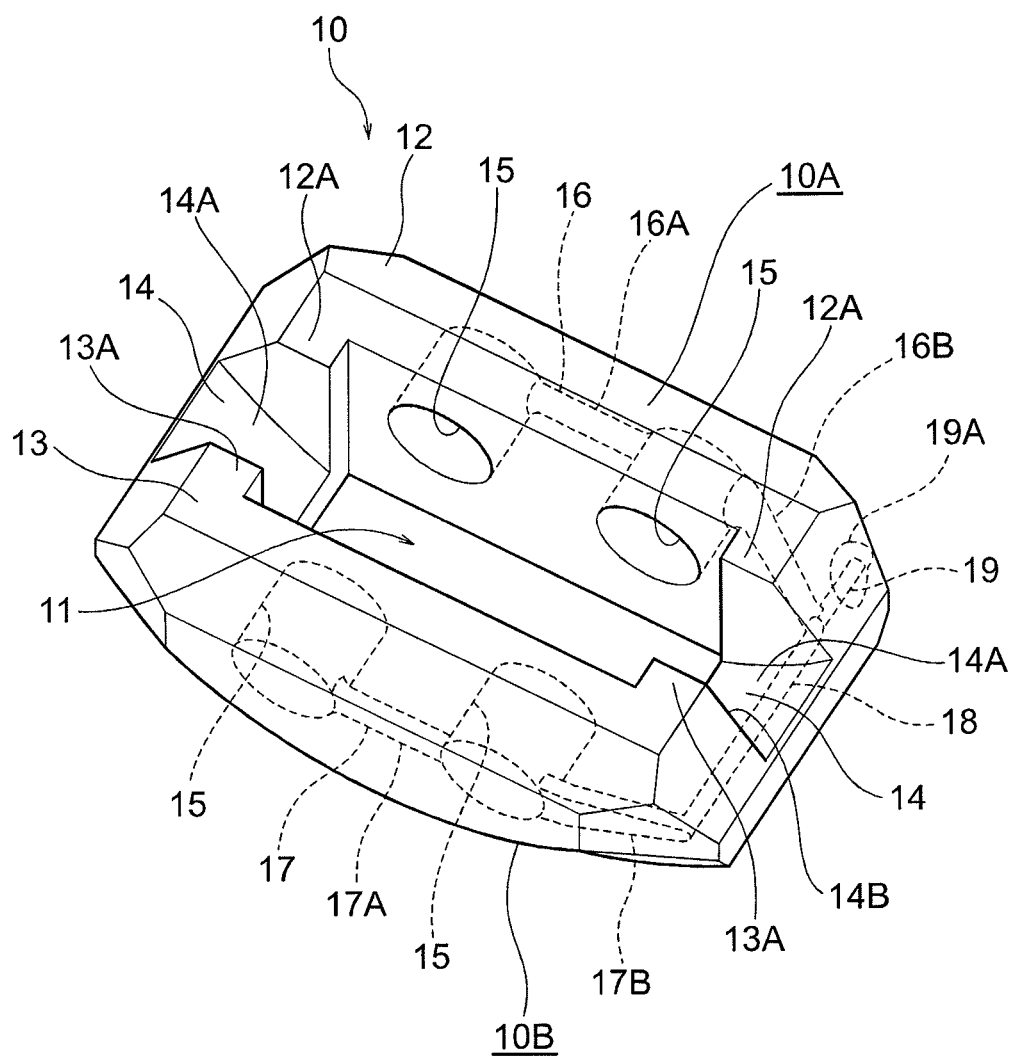
FIG. 1 is an overall perspective view showing an embodiment of a caliper for disc brakes according to the present invention.
Figure 2:
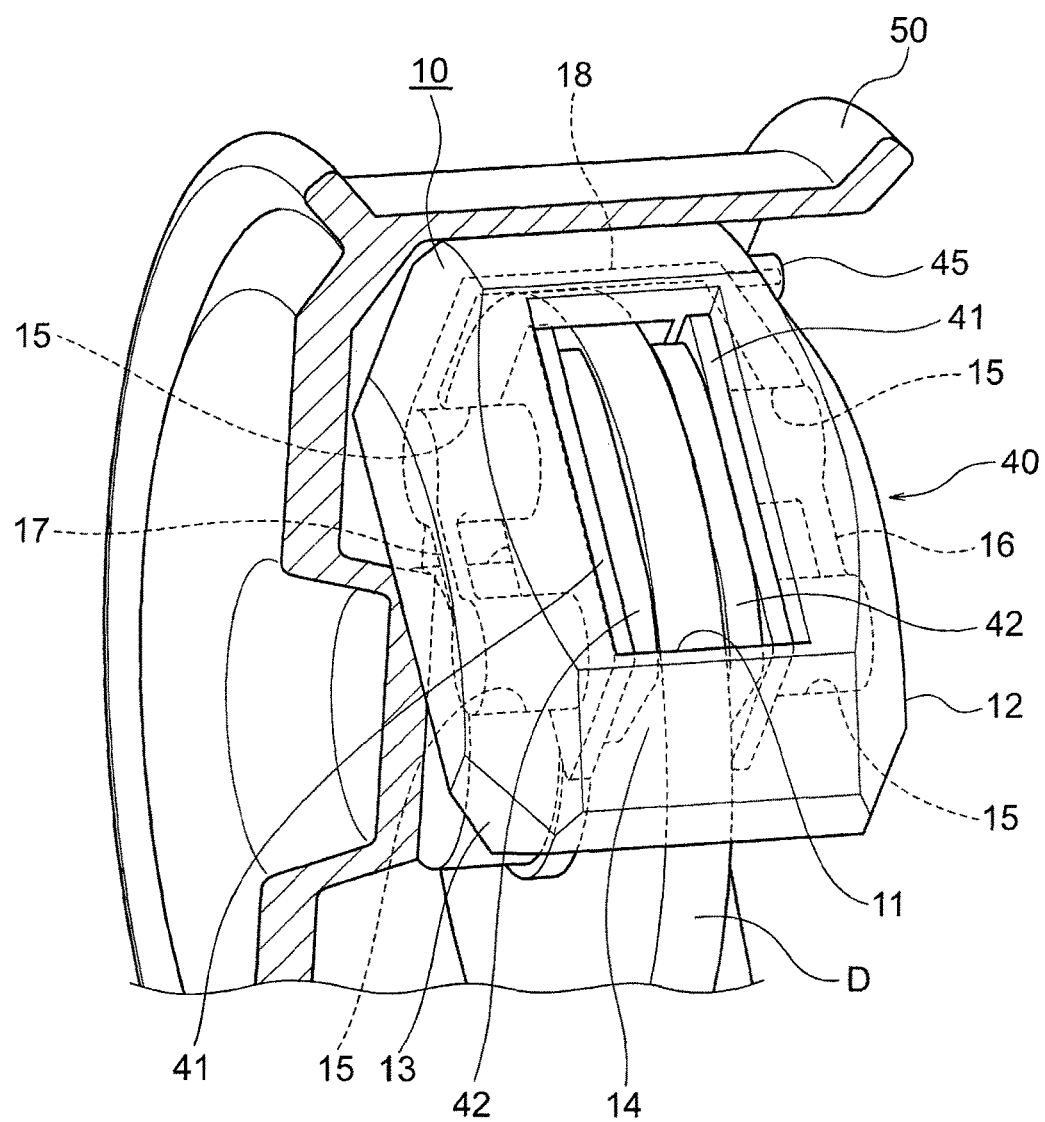
FIG. 2 is a perspective view showing a use state of the disc brake caliper disclosed in FIG. 1.

FIG. 1 shows the disc brake caliper (simply called a caliper hereinafter) 10 according to the embodiment, and FIG. 2 is an illustration showing a state where the caliper 10 is used as a disc brake 40 for automobiles.

First, the outlines of the disc brake 40 and the caliper 10 will be described by referring to FIGS. 1 and 2.

The caliper 10 is structured to include: an inner caliper section 12 and an outer caliper section 13 which are disposed to oppose to each other by having a disc rotor D interposed therebetween and the both end parts thereof in the length direction are linked integrally by a bridge section 14; and a plurality of hydraulic cylinders 15, 15 (two each on the inner caliper section 12 side and the outer caliper section 13 side in this embodiment) for pressurizing pistons which are provided in each of opposing surface regions of the inner caliper section 12 and the outer caliper section 13 and pressurize the disc rotor D from the both surfaces simultaneously via brake pads 42 at the time of operation.

In such caliper 10, the hydraulic cylinders 15, 15 of the inner caliper section 12 side and the hydraulic cylinders 15, 15 of the outer caliper section 13 side are linked via cylinder-side hydraulic channels 16, 17 provided on the respective back face sides and a hydraulic linking channel 18 provided inside the bridge section 14.

Further, each of the cylinder-side hydraulic channels 16, 17 and the hydraulic linking channel 18 are formed through providing a connecting channel forming section 22 (see FIG. 9) corresponding to each of the cylinder-side hydraulic channels 16, 17 and the hydraulic linking channel 18 in advance in the core 20 (see FIG. 9) which is used at the time of casting-molding the inner caliper section 12, the outer caliper section 13, and the bridge section 14 to set a state of being simultaneously embedded in each of the caliper sections 12, 13 and the bridge section 14 at the time of integrally casting-molding each of the caliper sections 12, 13 and the bridge section 14.

The disc brake 40 is a piston-opposed type disc brake, and the disc brake 40 is attached and fixed to an attaching member, not shown, of a car body. Further, the caliper 10 is disposed in such a manner that the hydraulic linking channel 18 formed in the caliper 10 is located on the top side that is the upper side of the car body.

As described above, the hydraulic cylinders 15, 15, the pistons (not shown) that are provided inside the hydraulic cylinders 15, 15 and operated by the oil pressures, and the brake pads 42 attached to the tip ends of the pistons via pad attaching plates 41 are provided to the caliper 10. The disc brake 40 is structured in the manner described above. Thus, when the pistons are moved forward to the disc rotor D side by the oil pressure, the brake pads 42 slide against the disc rotor D and brake the rotation of the disc rotor D. That is, the brake comes in effect.

Figure 3:
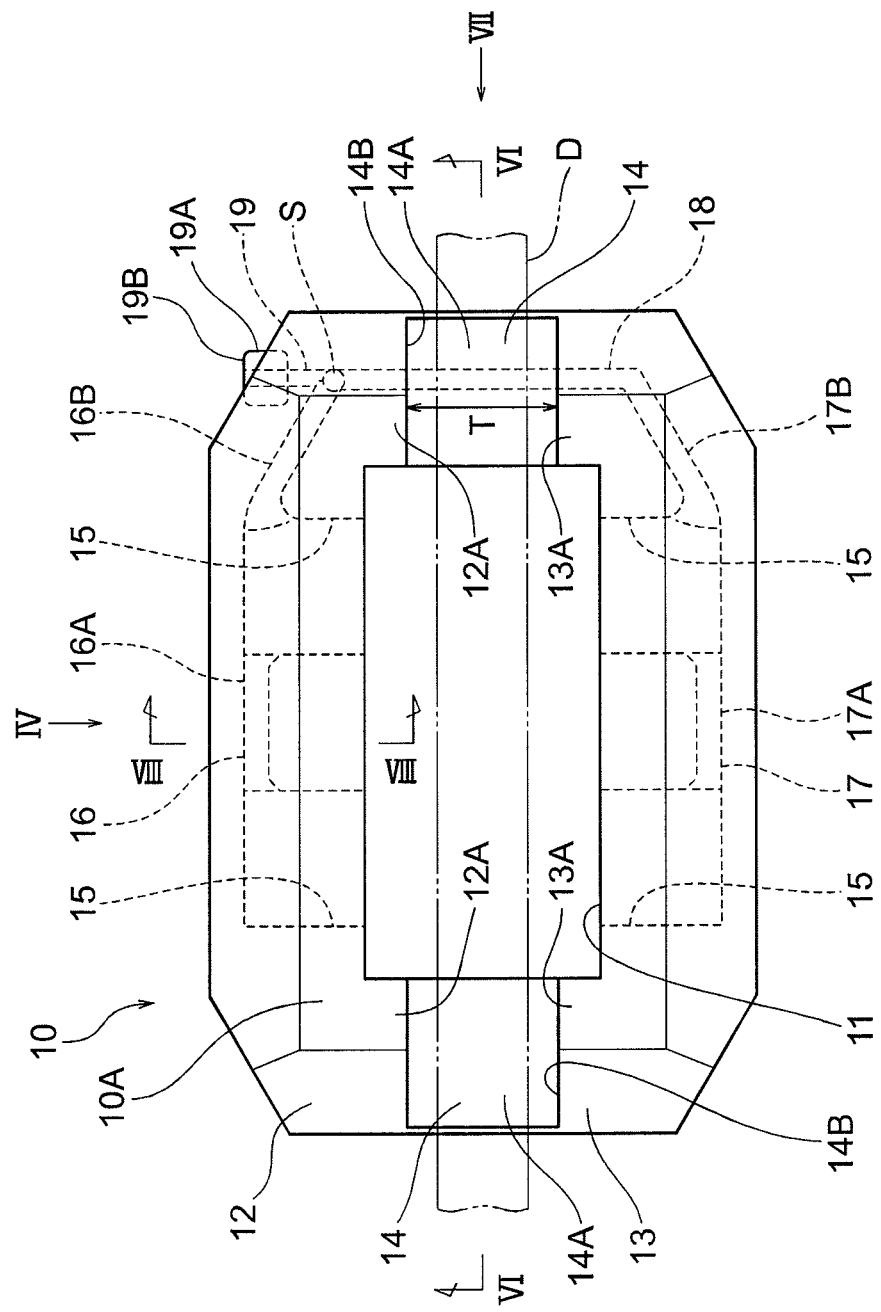
FIG. 3 is a plan view showing the disc brake caliper disclosed in FIG. 1.

As shown in FIG. 3, the caliper 10 constituted with the inner caliper section 12, the outer caliper section 13, and the bridge section 14 has its four corners chamfered greatly on a plan view, and it is formed in a rectangular shape while having the inside thereof being formed as an opening part. The inner caliper section 12 and the outer caliper section 13 are formed in a shape having projection sections 12A, 13A projected towards directions facing to each other in both end parts in the respective length directions, and the bottom parts of those projection sections 12A, 13A are linked integrally via the bridge section 14.

Therefore, in the caliper 10, the opening part in a rectangular shape is formed by the respective inner-side side faces of each of the caliper sections 12, 13, and the bridge section 14, and a window hole 11 is constituted by the opening part.

Figure 6:
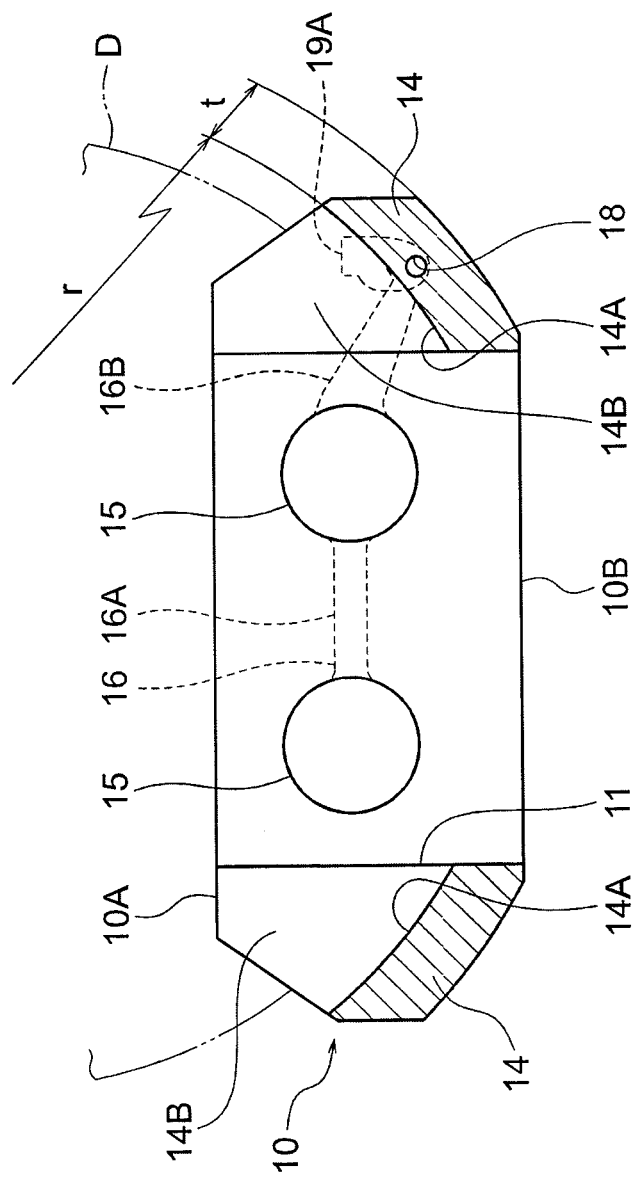
FIG. 6 is a longitudinal sectional view taken along a line VI-VI in FIG. 3.

As shown in FIG. 3, the bridge section 14 is in a shape in which one end face of the projection section 12A and that of the projection section 13A of the inner caliper section 12 and the outer caliper section 13 are bored into a prescribed depth in a width size T. As a result, as shown in FIG. 6, the bridge section 14 is formed in a thickness of size t, which is greatly thinner than the thickness of the inner caliper section 12 and the outer caliper section 13.

Further, in the bridge section 14, the opposing surface 14A which opposes to the outer peripheral surface of the disc rotor D is formed in an arc shape having a radius size r. Furthermore, the radius size r of the opposing surface 14A is set to be larger than the radius size of the disc rotor D by a prescribed amount.

As described above, the width of the bridge section 14 is formed in the size T, and the width size T is set to be larger than the width of the disc rotor D. Further, there is a gap in a prescribed size provided between the opposing surface 14A of the bridge section 14 and the outer periphery of the disc rotor D. Thereby, the disc rotor D can be rotated in the direction along the arc-shaped opposing surface 14A of the bridge section 14.

That is, a disc groove 14B is formed by the opposing surface 14A of the bridge section 14 and the one end face of the projection section 12A and that of the projection section 13A of the inner caliper section 12 and the outer caliper section 13.

As described above, the two hydraulic cylinders 15, 15 of the inner caliper section 12 and the two hydraulic cylinders 15, 15 of the outer caliper section 13 are linked by the cylinder-side hydraulic channels 16, 17 which are provided to the respective back face sides and the hydraulic linking channel 18 which is provided inside the bridge section 14.

The cylinder-side hydraulic channel 16 of the inner caliper section 12 is constituted with: a linear-type first channel 16A which links the two hydraulic cylinders 15, 15 of the inner caliper section 12 to each other; and a sloping-shaped second channel 16B extended on the bridge section 14 side from one of the hydraulic cylinders 15 while being linked to the first channel 16A. Note that there is no first channel 16A in a case of the two pots where one each of the opposing hydraulic cylinders is provided to the inner caliper section and the outer caliper section.

Figure 8:
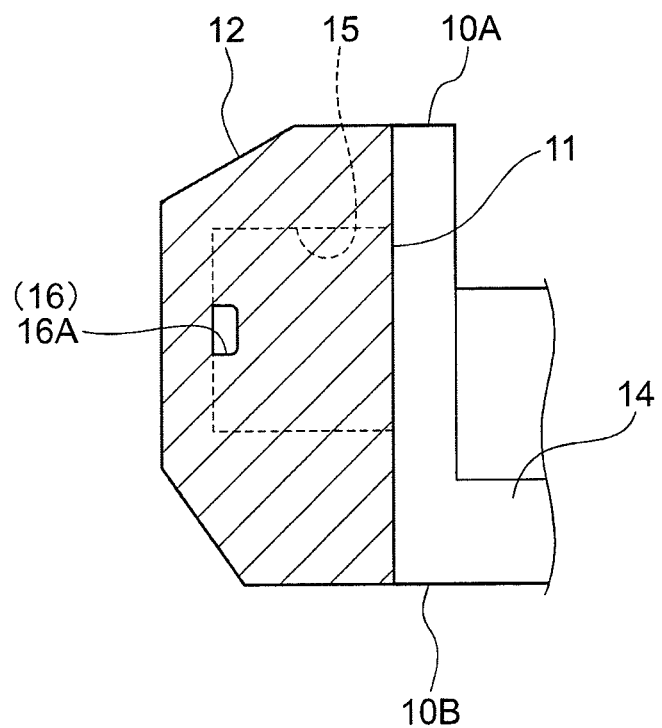
FIG. 8 is a longitudinal sectional view taken along a line VIII-VIII in FIG. 3.

As shown in FIG. 8, the first channel 16A is formed substantially in a square shape in sectional view. One straight-line part of the side face thereof is formed to roughly match the bottom part of the hydraulic cylinders 15, 15. Further, the second channel 16B is formed substantially same as the shape of the first channel 16A.

Further, the cylinder-side hydraulic channel 17 of the outer caliper section 13 is constituted with: a linear-type first channel 17A which links the two hydraulic cylinders 15, 15 of the outer caliper section 13 to each other; and a sloping-shaped second channel 17B extended on the bridge section 14 side from one of the hydraulic cylinders 15 while being linked to the first channel 17A. Note that there is no first channel 17A in a case of the two pots where one each of the opposing hydraulic cylinders is provided to the inner caliper section and the outer caliper section.

As shown in FIG. 8, the first channel 17A and the second channel 17B are formed substantially same as the shapes of the first channel 16A and the second channel 16B of the inner caliper section 12.

As shown in FIG. 6, the hydraulic linking channel 18 is formed inside the bridge section 14. As shown in FIGS. 1, and 3, the both end sections of the hydraulic linking channel 18 are linked, respectively, to the end section of the second channel 16B of the cylinder-side hydraulic channel 16 and the end section of the second channel 17B of the cylinder-side hydraulic channel 17.

The hydraulic linking channel 18 is opened closer to the center of the bridge section 14 in the thickness t.

A bleeder hole 19 for releasing air is opened to be linked to the hydraulic linking channel 18 in the inner caliper unit 12 from the outer surface thereof towards the hydraulic linking channel 18 along the hydraulic linking channel 18.

Figure 4:
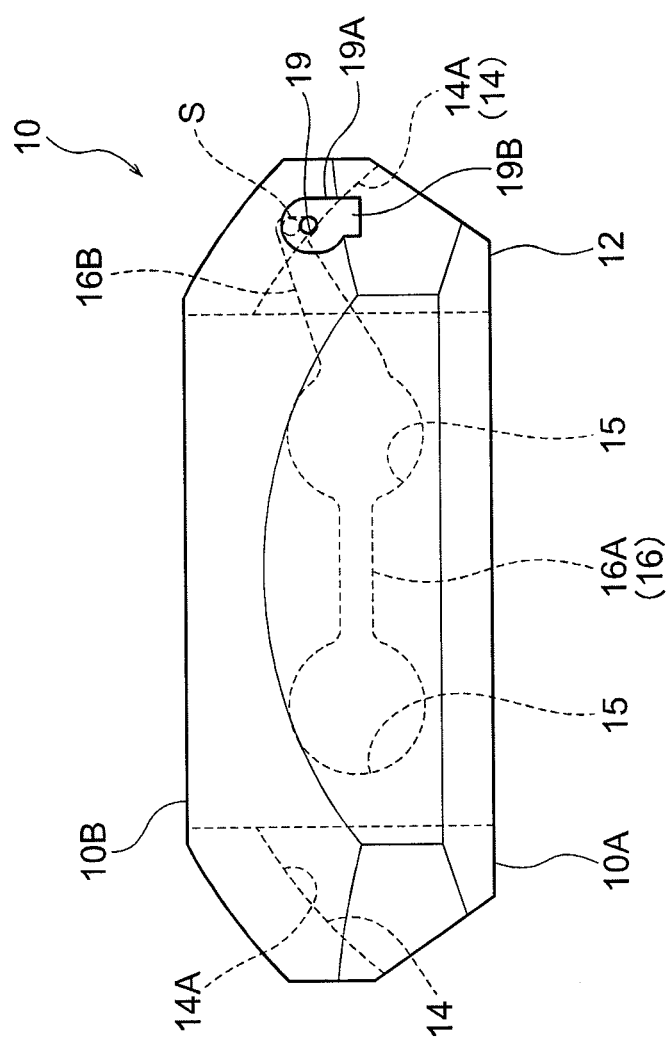
FIG. 4 is a perspective view from an arrow IV in FIG. 3.
Figure 5:
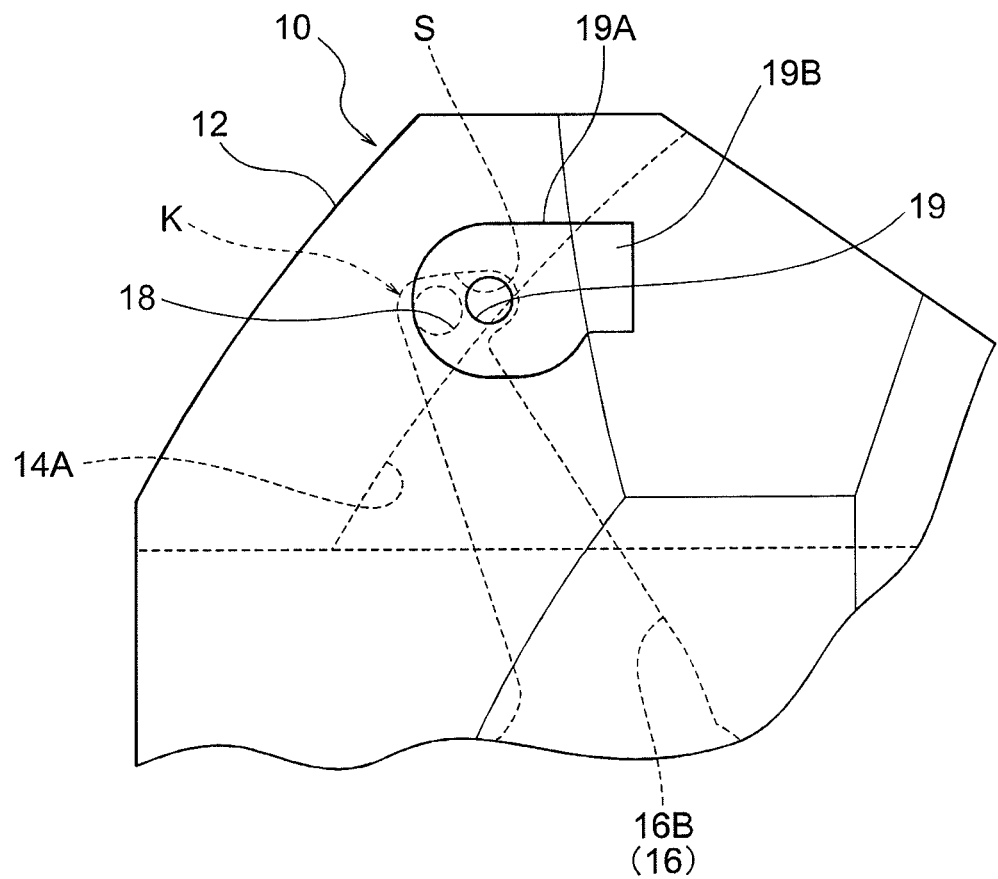
FIG. 5 is an enlarged view in the vicinity of a bleeder hole shown in FIG. 4.

As shown in FIGS. 4 to 6, the bleeder hole 19 and the hydraulic linking channel 18 are formed in such a manner that the positions of the center lines thereof are slightly shifted from each other. That is, while the hydraulic linking channel 18 is opened closer to the center of the bridge section 14 in the thickness t as described above, the bleeder hole 19 is formed away from the hydraulic linking channel 18 towards the center part side of the disc rotor D by a prescribed amount. Thus, in that state, the overlapping part between the bleeder hole 19 and the hydraulic linking channel 18 is small, so that the linking state between the both the bleeder hole 19 and the hydraulic linking channel 18 may become insufficient.

Therefore, as shown in details in FIG. 5 in particular, the embodiment is designed to form an inner space S for including the end parts of the bleeder hole 19 and the hydraulic linking channel 18 at a connection point K between the end part of the hydraulic linking channel 18 located on the inner caliper unit 12 side and the top end of the bleeder hole 19 so that the bleeder hole 19 and the hydraulic linking channel 18 are linked to each other in a sufficiently overlapping manner via the inner space S.

The bleeder hole 19 is designed to be opened towards the hydraulic linking channel 18 from the outer surface of the inner caliper unit 12, and the start point of the hole processing by using a drill on the outer surface of the inner caliper unit 12 must be on a flat surface.

Figure 7:
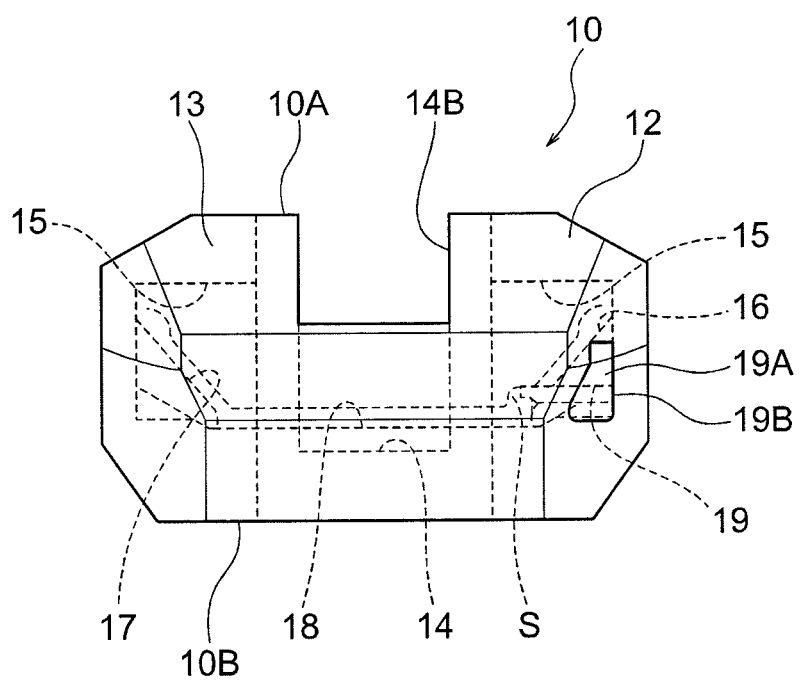
FIG. 7 is a perspective view from an arrow VII in FIG. 3.

Thus, as shown in FIG. 3 and FIG. 7, an air bleeder attaching section 19A projected to the outer side from the outer surface is formed in one end part of the bleeder hole 19 on the outer surface side of the inner caliper unit 12. Further, a top end face 19B of the air bleeder attaching section 19A is formed to be almost orthogonal to the bleeder hole 19 so that the hole processing by the drill can be done easily.

Further, a dent part (not shown) in a V-letter shape in sectional view, which guides the tip of the drill when opening the bleeder hole 19, may be formed in advance in the top end face 19B of the air bleeder attaching section 19A.

An air bleeder 45 (see FIG. 2) is mounted to the bleeder hole 19.

While the air bleeder attaching section 19A is formed in a state being projected towards the outer side form the outer surface of the inner caliper unit 12, it may simply need to have a surface that is almost orthogonal to the bleeder hole 19 and may be formed in a shape recessed from the outer surface of the inner caliper unit 12.

As described above, the thickness t of the bridge section 14 is thinner than the thickness of the inner caliper unit 12. Thus, when providing the hydraulic linking channel 18, it is desirable to form it near the center part of the bridge section 14 in the thickness t in view of the strength of the bridge section 14.

In the meantime, as shown in FIG. 2, the air bleeder 45 is mounted to the bleeder hole 19. When mounting the air bleeder 45, the attaching position of the air bleeder 45, i.e., the position of the bleeder hole 19, is limited so that the air bleeder 45 and a wheel 50, other interference objects or the like (not shown) do not interfere with each other.

Recently, the size of the disc rotor D is becoming bigger. However, it is difficult to increase the size of the wheel 50 accordingly due to various conditions. Thus, the embodiment is designed to satisfy the above-described two required matters through slightly shifting the center line of the bleeder hole 19 to which the air bleeder 45 is mounted and the center line of the hydraulic linking channel 18 when attaching the air bleeder 45 at the optimum position.

Here, in a state of FIG. 1 where the bridge section 14 is exposed on the surface in the caliper 10 described above, the upper region of the opposing surface 14A of the bridge section 14 which corresponds to substantially a half of the thickness of the caliper 10 is defined as an inner periphery section 10A of the caliper 10, while the opposite side of the inner periphery section 10A, i.e., the back face region of the opposing surface 14A of the bridge section 14, is defined as an outer periphery section 10B of the caliper 10.

The caliper 10 described above is casting-molded by a gravity casting method, for example, by setting a core 20 within cavities 31A, 32A of a mold 30 and pouring molten metal constituted with aluminum or an aluminum alloy.

First, the core 20 will be described by referring to FIG. 9.

The core 20 used in this embodiment is a shell core that is acquired by solidifying silica sand covered by resin by applying heat to be formed into a prescribed shape.

The core 20 has a substantially cuboid shaped main body unit 21 where a window hole 11 of the caliper 10 is to be formed. On both sides of the main body section 21 in the width direction, inner-side cylinder forming projection sections 25, 25 for forming the two cylinders 15, 15 of the inner caliper section 12, respectively, and outer-side cylinder forming projection sections 25, 25 for forming the two cylinders 15, 15 of the outer caliper section 13, respectively, are provided.

The connecting channel forming section 22 corresponding to each of the cylinder-side hydraulic channels 16, 17 of the caliper 10 and the hydraulic linking channel 18 is provided in advance to the core 20.

The connecting channel forming section 22 is set to have the core 20 embedded in the bridge section 14 and each of the caliper sections 12, 13 simultaneously at the time of integrally casting-molding, and the connecting channel forming section 22 is eliminated after the casting-molding to form each of the cylinder-side hydraulic channels 16, 17 and the hydraulic linking channel 18.

The connecting channel forming section 22 is constituted with: cylinder-side hydraulic channel connecting sections 23 and 24 which are extended towards the bridge section 14 side along the inner caliper section 12 and the outer caliper section 13 from the back face sides of each of the hydraulic cylinders 15, 15 of the inner caliper section 12 and the outer caliper section 13; and a hydraulic linking channel connecting section 26 which is connected to top end parts (same as each of the top end parts of second connecting sections 23B and 24B to be described later) of each of the connecting sections 23, 24 and casting-molds the hydraulic linking channel 18 embedded inside the bridge section 14.

Note here that the cylinder-side hydraulic channel connecting section 23 which constitutes the connecting channel forming section 22 is constituted with: a first connecting section 23A which is provided on the back face sides of each of the neighboring hydraulic cylinder forming projection sections 25, 25 and connects each of the forming projection sections 25, 25 to each other; and a second connecting section 23B which is linked to the first connecting section 23A and extended towards the bridge section 14 side from the back face side of each of the hydraulic cylinder forming projection sections 25, 25. In a case of the two pots where one each of the opposing hydraulic cylinders is provided to the inner caliper section and the outer caliper section, provided is one each of the corresponding cylinder forming projection sections 25 and there is no first connecting section 23A.

Similarly, the cylinder-side hydraulic channel connecting section 24 which constitutes the connecting channel forming section 22 is constituted with: a first connecting section 24A which is provided on the back face sides of each of the neighboring hydraulic cylinder forming projection sections 25, 25 and connects each of the forming projection sections 25, 25 to each other; and a second connecting section 24B which is linked to the first connecting section 24A and extended towards the bridge section 14 side from the back face side of each of the hydraulic cylinder forming projection sections 25, 25. In a case of the two pots where one each of the opposing hydraulic cylinders is provided to the inner caliper section and the outer caliper section, provided is one each of the corresponding cylinder forming projection sections 25 and there is no first connecting section 24A.

Further, the hydraulic linking channel connecting section 26 is placed across the top end parts of the second connecting section 23B and the second connecting section 24B.

At the connection point K between the second connecting section 23B located on the inner caliper section 12 side and the hydraulic linking channel connecting section 26, a connection knot section 26A for forming the inside space S of the caliper 10 in the connection point K.

The connection knot section 26A is provided by being projected towards the height direction side of the hydraulic cylinder forming projection section 25 at the connection point K between the hydraulic linking channel connecting section 26 and the second connecting section 23B.

Further, after eliminating the sand portion of the connection knot section 26A after casting, the inside space S (see FIGS. 4 and 5) is formed by the connection knot section 26A. At this time, the inside space S is almost in parallel to the surface of the disc rotor D and projected towards the center side of the disc rotor D. Towards the inside space S, as described above, the bleeder hole 19 for releasing the air is opened from the outer surface side of the inner caliper unit 12.

Next, the mold 30 will be described by referring to FIG. 10 to FIG. 14.

Figure 14:
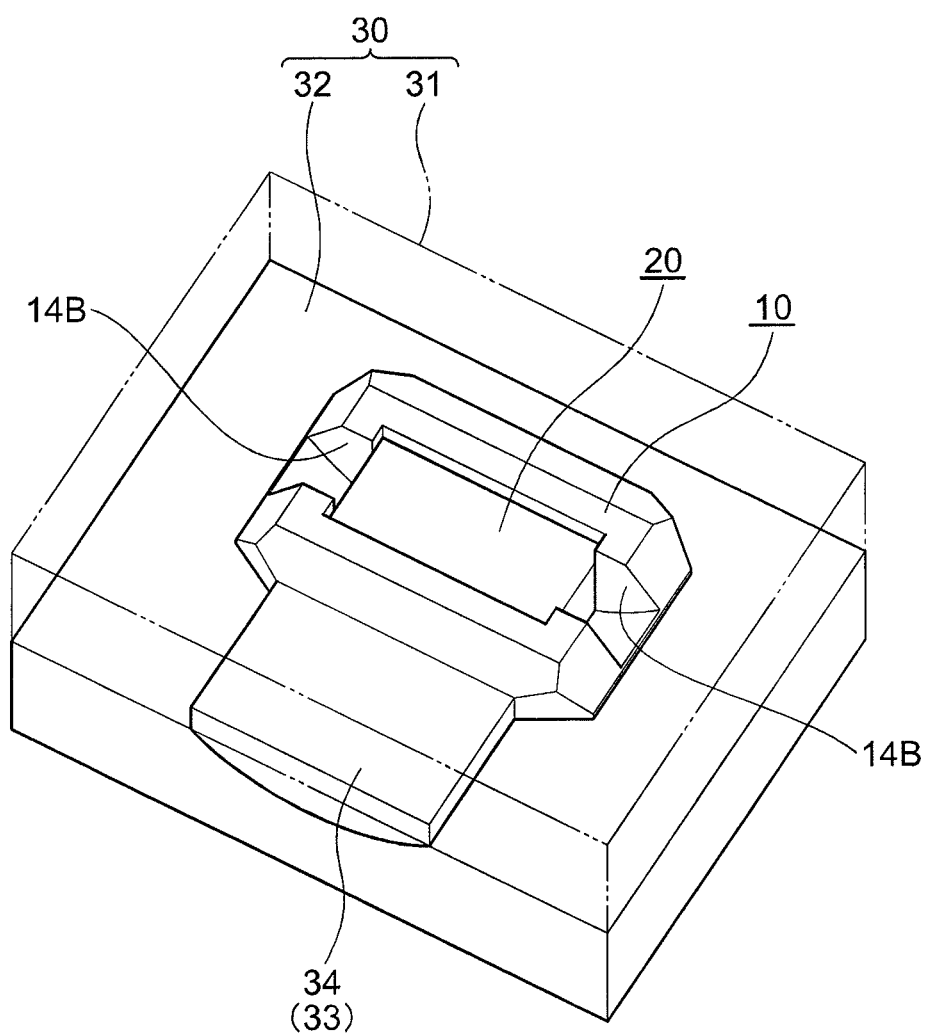
FIG. 14 is an overall perspective view showing a state where the disc brake caliper is cast by pouring a material into a cavity of the mold according to the embodiment disclosed in FIG. 1.

As shown in FIG. 14, the mold 30 is structured as a divided mold constituted with an inner periphery mold 31 and an outer periphery mold 32. Further, the mold 30 is used in a state where the core 20 is set to the outer periphery mold 32 and then the core 20 is pressed by the inner periphery mold 31.

The inner periphery mold 31 and the outer periphery mold 32 are formed with SKD 61 or the like, which is a tool steel excellent in the heat resistance and the abrasion resistance.

In the center part of the inner periphery mold 31, a cavity 31A which forms the inner periphery section 10A, for example, is formed in the upper part from the flat part of the riser 34, i.e., in about a half of the thickness of the caliper 10, in a state shown in FIG. 14. Further, at the part facing the cavity 31A in the center part of the inner periphery mold 31, a core holding section 31B which abuts against and holds the top face 21A of the main body section 21 of the core 20 placed on the outer periphery mold 32 is provided by being projected towards the outer periphery mold 32 side.

Further, at the part facing the cavity 31A on the center part of the inner periphery mold 31, a groove forming projection section 31C for forming the disc groove 14B is provided by being projected towards the outer periphery mold 32 side from the side-face base part of the both ends of a core holding section 31B in the length direction.

Figure 10:
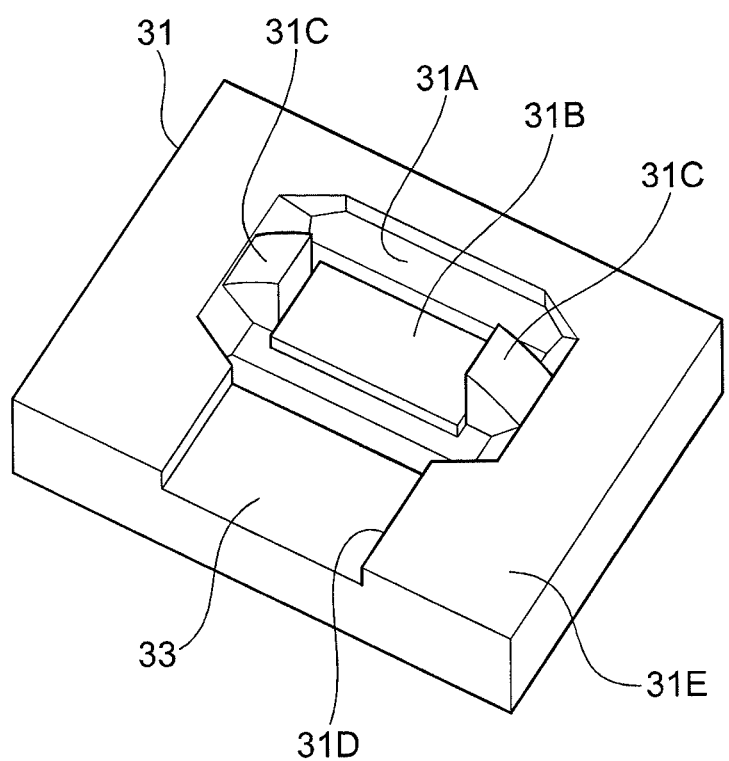
FIG. 10 is an overall perspective view showing an inner periphery mold of a mold used for casting the disc brake caliper disclosed in FIG. 1.

As shown in FIG. 10, in the center part of the inner periphery mold 31 in the length direction, a dent section 31D for forming a sprue section 33 connected to the cavity 31A is formed. The dent section 31D is formed as a square-shaped dent in a prescribed thickness and in a length close to the entire region of the caliper 10 in the length direction.

Further, the part of the inner periphery mold 31 other than the cavity 31A and the dent section 31D is a divided mold face 31E between with the outer periphery mold 32.

Figure 11:
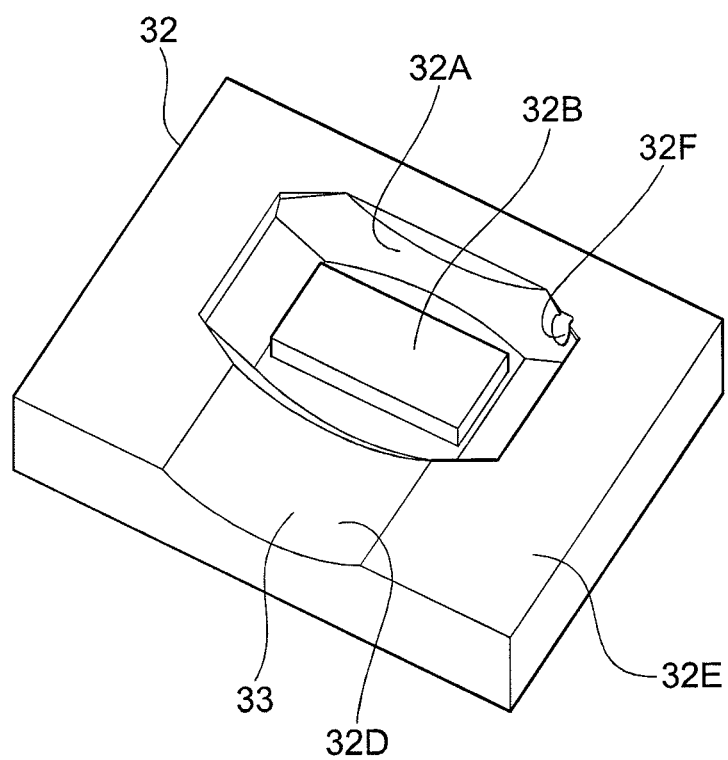
FIG. 11 is an overall perspective view showing an outer periphery mold of the mold used for casting the disc brake caliper disclosed in FIG. 1 in an opened state.

As show in FIG. 11, in the outer periphery mold 32, a cavity 32A for forming the outer periphery section 10B, for example, is formed in a remaining half of the thickness of the caliper 10. The cavity 32A and the cavity 31A of the inner periphery mold 31 are formed in such a manner that the outer contours of those match with each other.

Further, the outer shape of the caliper 10 is formed by pouring molten metal of the aluminum or the aluminum alloy into the cavity 31A of the inner periphery mold 31 and the cavity 31A of the outer periphery mold 32.

Further, at a part facing the cavity 32A substantially in the center part of the outer periphery mold 32, a core loading surface part 32B (see FIG. 11) for loading the core 20 by abutting against a bottom face 21B (see FIGS. 9 and 13) of the core 20 that is placed on the outer periphery mold 32 of the mold 30 is formed by being projected towards the inner periphery mold 31 side. Furthermore, substantially in the center part of the outer periphery mold 32 in the length direction, a dent section 32D which constitutes a sprue section 33 connected to the cavity 32A is formed. The dent section 32D is formed by corresponding to the dent section 31D of the inner periphery mold 31, and it is formed in an arc shape recessed from a divided mold surface 32E of the outer periphery mold 32 corresponding to the divided mold surface 31E of the inner periphery mold 31.

Further, when the inner periphery mold 31 and the outer periphery mold 32 are assembled, the sprue section 33 is formed by the dent sections 31E, 32E of each of the molds 31, 32.

Further, as shown in FIG. 11, an attaching forming section 32F for forming the air bleeder attaching section 19A is provided at one corner of the cavity 32A of the outer periphery mold 32. The attaching forming section 32F is formed in such a manner that the top end face 19B of the air bleeder attaching section 19A described by referring to FIGS. 3 and 7 becomes almost a perpendicular surface.

When the caliper 10 is formed by pouring the molten metal inside the cavity 31A of the inner periphery mold 31 and the cavity 32A of the outer periphery mold 32 constituting the mold 30, it is so set that the one where the air bleeder attaching section 19A is formed is the inner caliper section 12 while the other facing the sprue section 33 is the outer caliper section 13.

Next, a manufacturing method of the caliper 10 for manufacturing the caliper 10 of the embodiment through casting by using the above-described mold 30 and the core 20 will be described.

In the embodiment, the caliper 10 is cast by a gravity casting method, for example.

That is, the gravity casting method is a casting method with which the weight (gravity) of molten metal is utilized to fill the molten metal in the entire cavities 31A, 32A when performing casting by pouring the of molten aluminum or molten aluminum alloy in the cavities 31A, 32A from the sprue section 33 of the mold 30.

Figure 12:
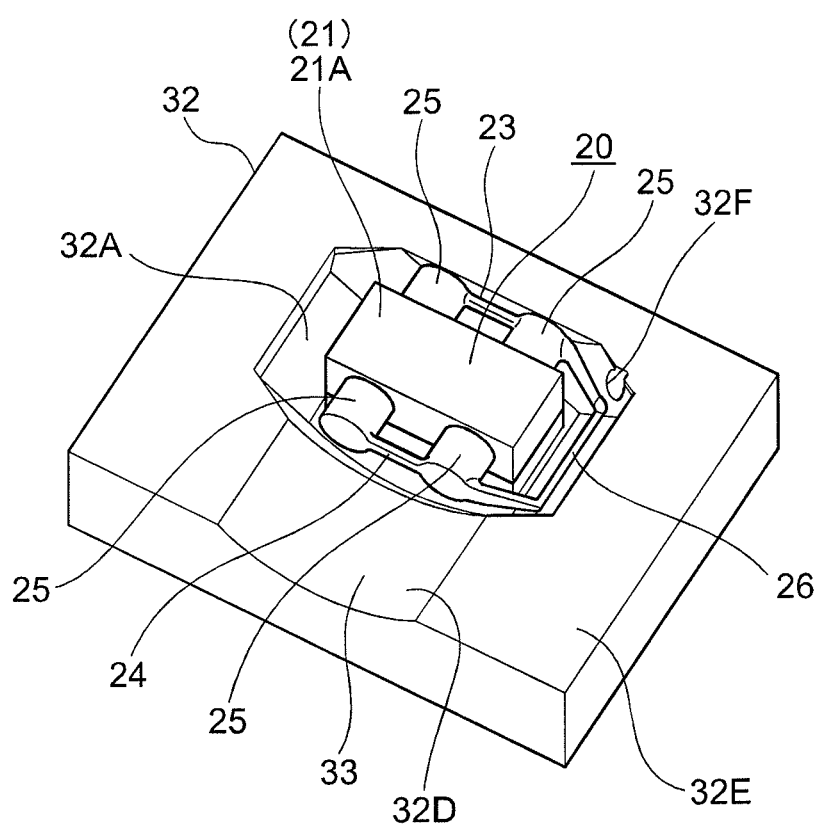
FIG. 12 is an overall perspective view showing a positional relation between the outer periphery mold of the mold and a core according to the embodiment disclosed in FIG. 1.

As the manufacturing procedure, first, as shown in FIG. 12, the bottom face 21B of the main body section 21 of the core 20 is placed, aligned, and fixed on the top face of the core loading section 32B within the cavity 32A of the outer periphery mold 32. Then, the inner periphery mold 31 is abutted against the outer periphery mold 32 and aligned with each other to assemble the mold 30.

Figure 13:
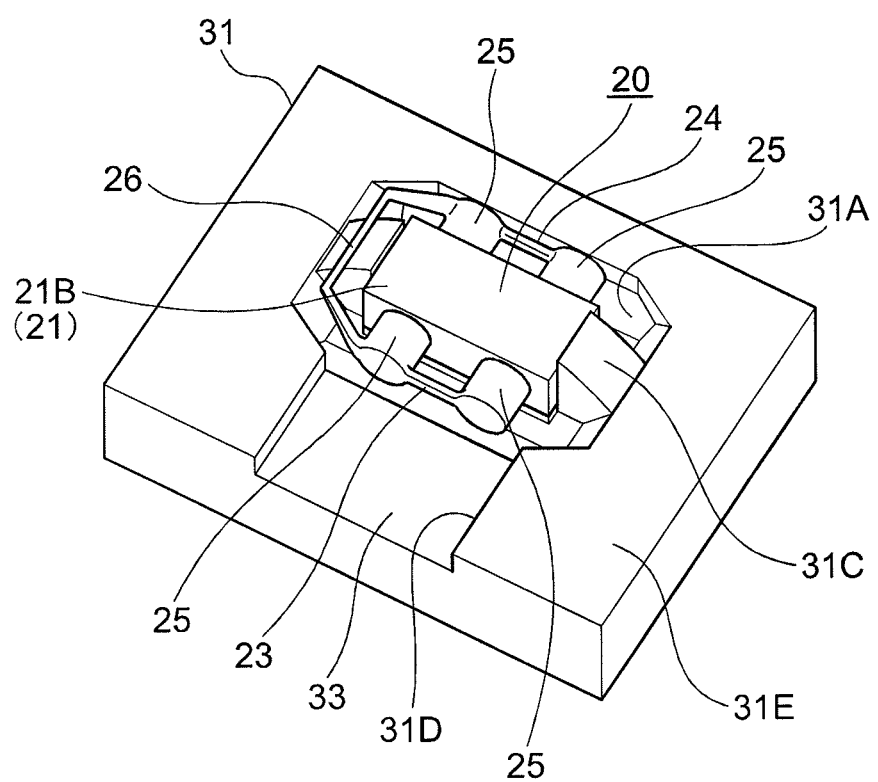
FIG. 13 is an overall perspective view showing a positional relation between the inner periphery mold of the mold and the core according to the embodiment disclosed in FIG. 1.

FIG. 13 shows the relation between the inner periphery mold 31 and the core 20 when the core 20 is set inside the cavity 32A of the outer periphery mold 32 and the inner periphery mold 31 is aligned with the outer periphery mold 32.

Then, the molten metal is poured and filled into the cavities 31A, 32A of the mold 30 from a casting device, not shown, via the sprue section 33 of the mold 30, and casting is performed by the gravity casting method.

When the caliper 10 is manufactured by pouring the molten metal into the sprue section 33, the molten metal filled in the sprue section 33 constitutes the riser section 34.

Figure 15:
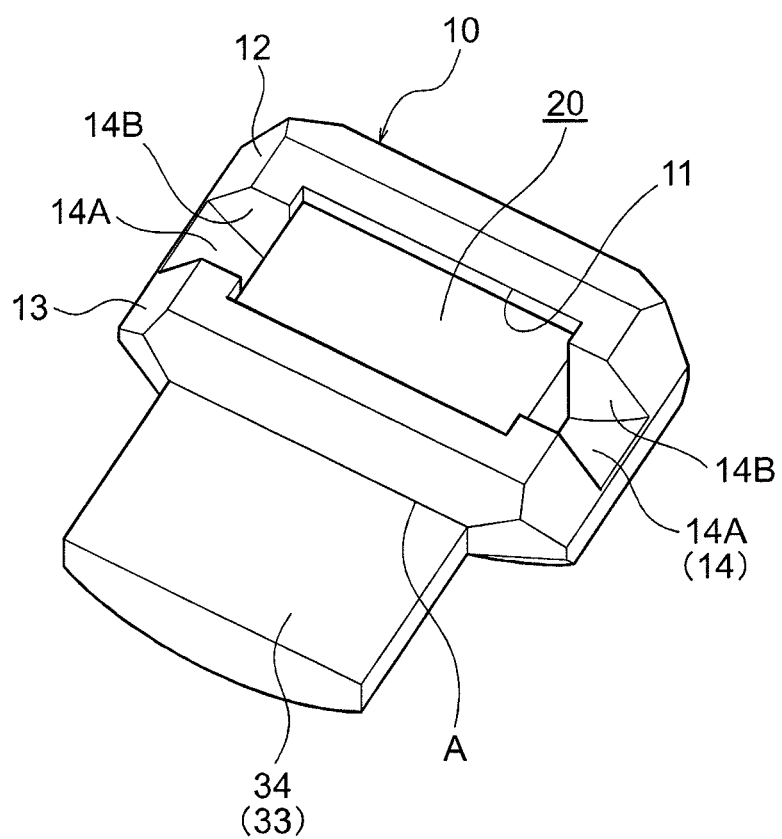
FIG. 15 is an overall perspective view showing a state where the disc brake caliper with a riser is taken out from the state disclosed in FIG. 14.
Figure 16:
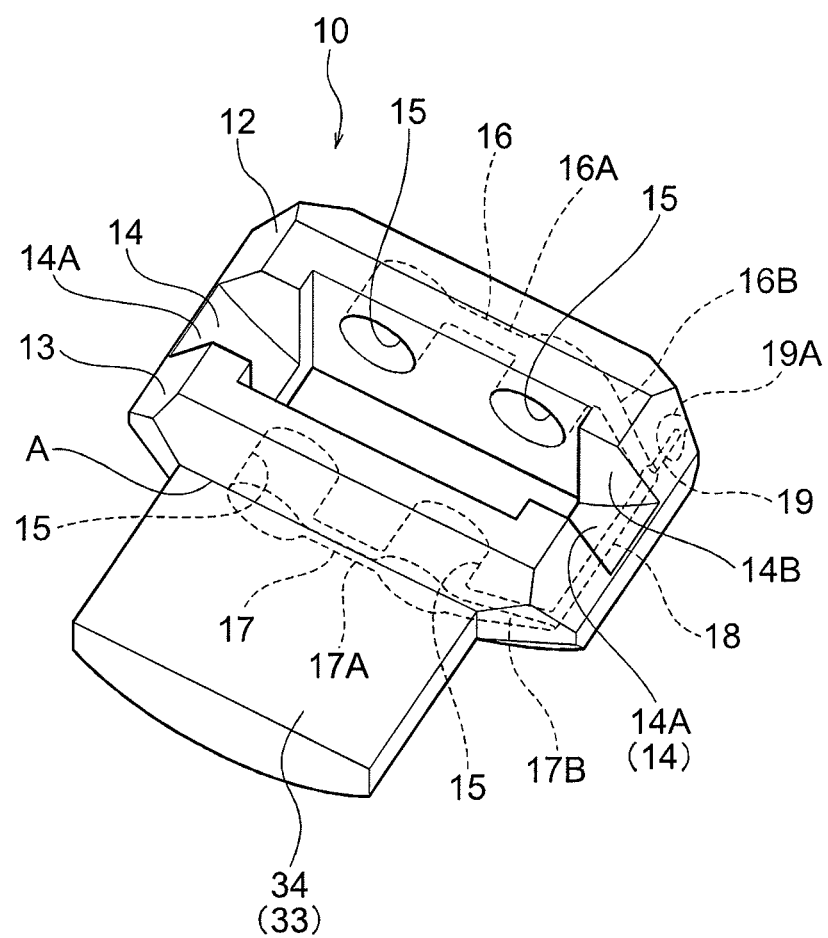
FIG. 16 is an overall perspective view showing a state where the core is taken out from the state shown in FIG. 15.

After the casting work is completed and the inner periphery mold 31 and the outer periphery mold 32 are taken out after a prescribed time has passed, the cast caliper 10 is taken out as shown in FIG. 15. Thereafter, the core 20 is broken down by melting the resin contained in the core 20 by a method such as applying heat treatment at a prescribed temperature. Then, when the caliper 10 is sufficiently cooled down, the sand portion of the core 20 remained inside the inner-side cylinders 15, 15, the outer-side cylinders 15, 15, the cylinder-side hydraulic linking channels 16, 17, and the hydraulic linking channel 18 is eliminated by blowing air, for example.

At this time, when air is blown from one of the inner-side cylinders 15, 15, for example, all the sand component can be eliminated easily from the inner side of all the cylinders 15, 15, the cylinder-side hydraulic linking channels 16, 17, and the hydraulic linking channel 18, since those are linked.

Thereafter, through cutting out the riser section 34 from the caliper 10 along a cut line A, the caliper 10 before applying processing treatment as shown in FIG. 10 can be completed.

Then, the bleeder hole 19 is opened by a drill of a prescribed diameter towards the inside space S from the top end face 19B of the air bleeder attaching section 19A of the caliper 10 to link the bleeder hole 19 and the hydraulic linking channel 18.

Following effects can be achieved with the caliper 10 with the structures described above.

(1) With the caliper 10 according to the embodiment, through linking the hydraulic cylinders 15, 15 of the inner caliper section 12 and the outer caliper section 13 by the cylinder-side hydraulic channels 16, 17 via the bridge section 14 and using the core 20, the hydraulic linking channel 18 for linking the cylinder-side hydraulic linking channels 16, 17 to each other can be integrally molded simultaneously with the cylinder-side hydraulic channels 16, 17. As a result, it is not necessary to perform hole processing by a drill after casting, i.e., not necessary to perform machining, for forming the hydraulic linking channel 18 for linking the cylinder-side hydraulic channels 16 and 17 provided to the inner caliper section 12 and the outer caliper section 13. Thus, the effort made for executing the processing described above can be lightened, thereby improving the productivity greatly.

(2) The cylinder-side hydraulic channels 16, 17 and the hydraulic linking channel 18 are integrally molded by the core 20 simultaneously at the time of casting, so that there is no position shift in the hole processing that is generated at the time of executing the hole processing. As a result, the oil pressure works uniformly on each of the hydraulic cylinders 15, 15 of the inner caliper section 12 and the outer caliper section 13 at the time of using the caliper 10. Therefore, stable braking can be expected, and there is no issue of uneven wear and the like generated in the brake pads 42.

(2) Since the hydraulic linking channel 18 is provided in the center side of the thickness t of the bridge section 14, it is possible to prevent having uneven thickness of the bridge section 14 for the hydraulic linking channel 18. Thereby, the strength of the bridge section 14 can be maintained.

(3) Since the cylinder-side hydraulic channels 16, 17 and the hydraulic linking channel 18 are molded integrally by the core 20, the sand portion of the core 20 inside each of the channels 16, 17, can also be eliminated completely and easily through eliminating the core 20 after casting and blowing air from one of the hydraulic cylinders 15, for example.

(4) At one end part of the outer surface side of the inner caliper section 12 of the bleeder hole 19, the air bleeder attaching section 19A projected towards the outer side from the outer surface is provided. The top end face 19B of the air bleeder attaching section 19A is formed in an almost orthogonal state with respect to the bleeder hole 19. As a result, the hole processing of the bleeder hole 19 by the drill can be done easily, and the mounting work of the air bleeder 45 to the bleeder hole 19 can be done easily as well.

(5) The large inside space S for including the end part of the bleeder hole 19 and the hydraulic linking channel 18 is formed at the connection point K between the end part of the hydraulic linking channel 18 located on the inner caliper section 12 side and the top end of the bleeder hole 19, and the bleeder hole 19 is processed from the outer surface of the inner caliper section 12 towards the inside space S. As a result, the bleeder hole 19 and the hydraulic linking channel 18 are linked to each other via the inside space S, so that the bleeder hole 19 and the hydraulic linking channel 18 can be linked securely.

Due to the relation between the increase in the size of the disc rotor D and the wheel 50, it is required to provide the air bleeder 45 to be mounted to the inner caliper section 12 at the position so as not to interfere with the wheel 50 and other interference objects. On the other hand, it is preferable to provide the hydraulic linking channel 18 at the center of the bridge section 14 in the thickness t. It is difficult to satisfy the both conditions. However, the embodiment is designed to shift the center line of the bleeder hole 19 to which the air bleeder 45 is mounted and the center line of the hydraulic linking channel 18, and to link the end parts of the both in the inside space S. Therefore, the air bleeder 45 can be provided at the optimum position and the bleeder hole 19 can be provided at the position where the strength of the bridge section 14 is not deteriorated.

While the present invention has been described above by referring to the embodiment shown in the drawings, the present invention is not limited only to the embodiment described above. Regarding the structures and details of the present invention, various changes and modifications occurred to those skilled in the art can be applied. Further, the present invention includes the structures acquired by properly and mutually combining a part of or a whole part of the structures of the above-described embodiment.

For example, while the embodiment employs the 4-pot opposed-type caliper 10 constituted with the hydraulic cylinders 15 and 15 placed two each by opposing to each other, the present invention is not limited only to such case. The present invention can be applied also to the opposed-type caliper of 2-pot type, 6-pot type, or more.

Figure 9:
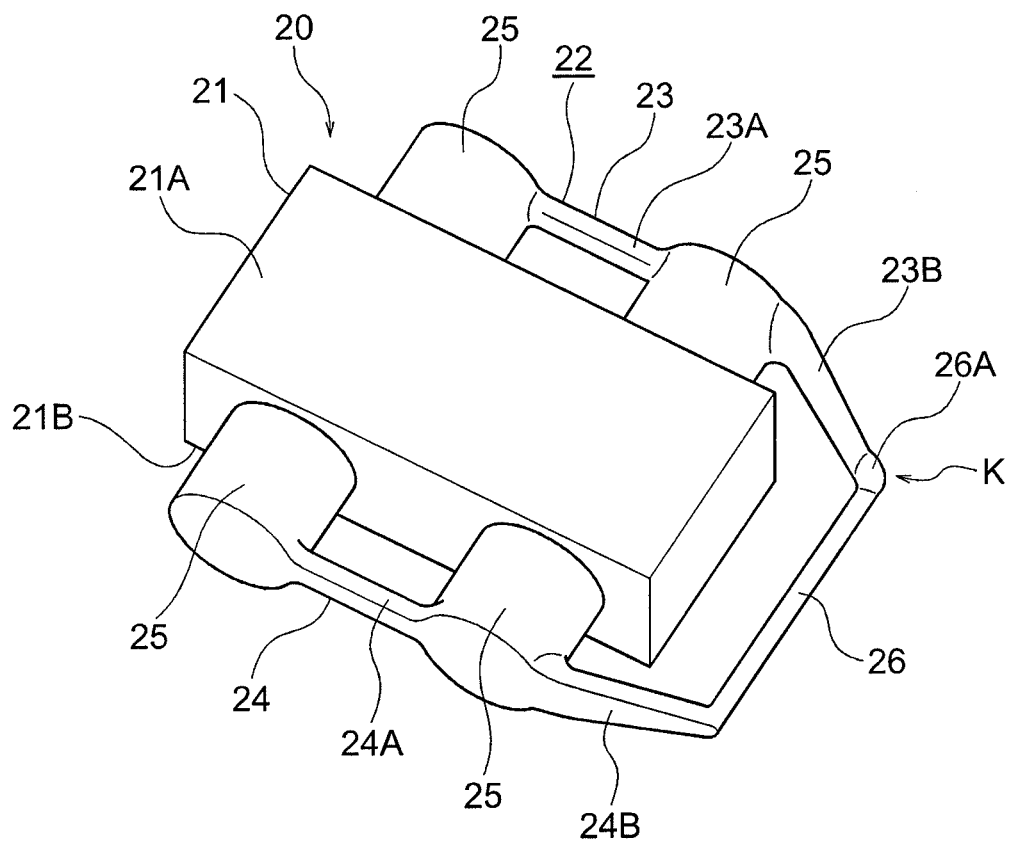
FIG. 9 is an overall perspective view showing a core used for casting the disc brake caliper disclosed in FIG. 1.

Further, in the embodiment, the core 20 is formed in a shape having the hydraulic linking channel 26 disposed on one end side of the main body unit 21 in the length direction from the two each of the cylinder forming sections 25, 25 provided on both sides of the main body section 21 in the width direction as shown in FIG. 9. However, the present invention is not limited to such case.

Figure 17:
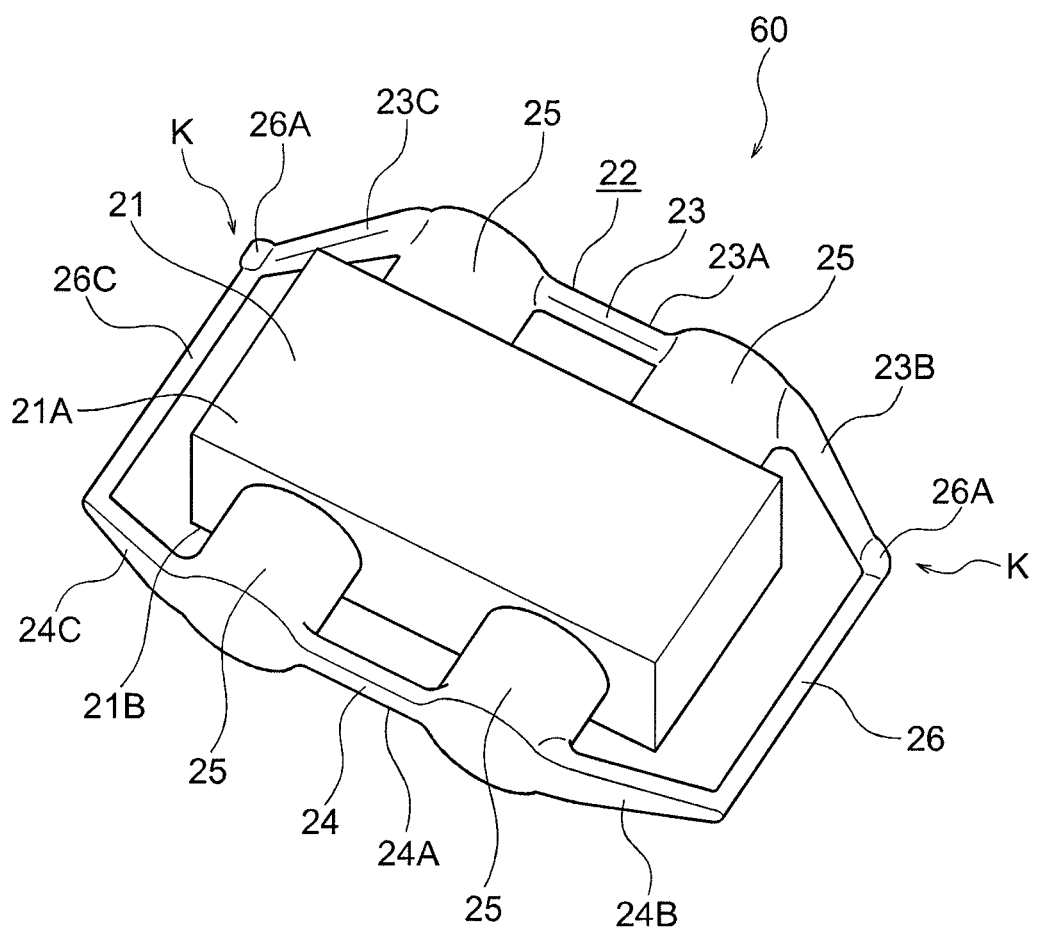
FIG. 17 is an overall perspective view showing a modification example of the core of the embodiment disclosed in FIG. 1.
Figure 18:
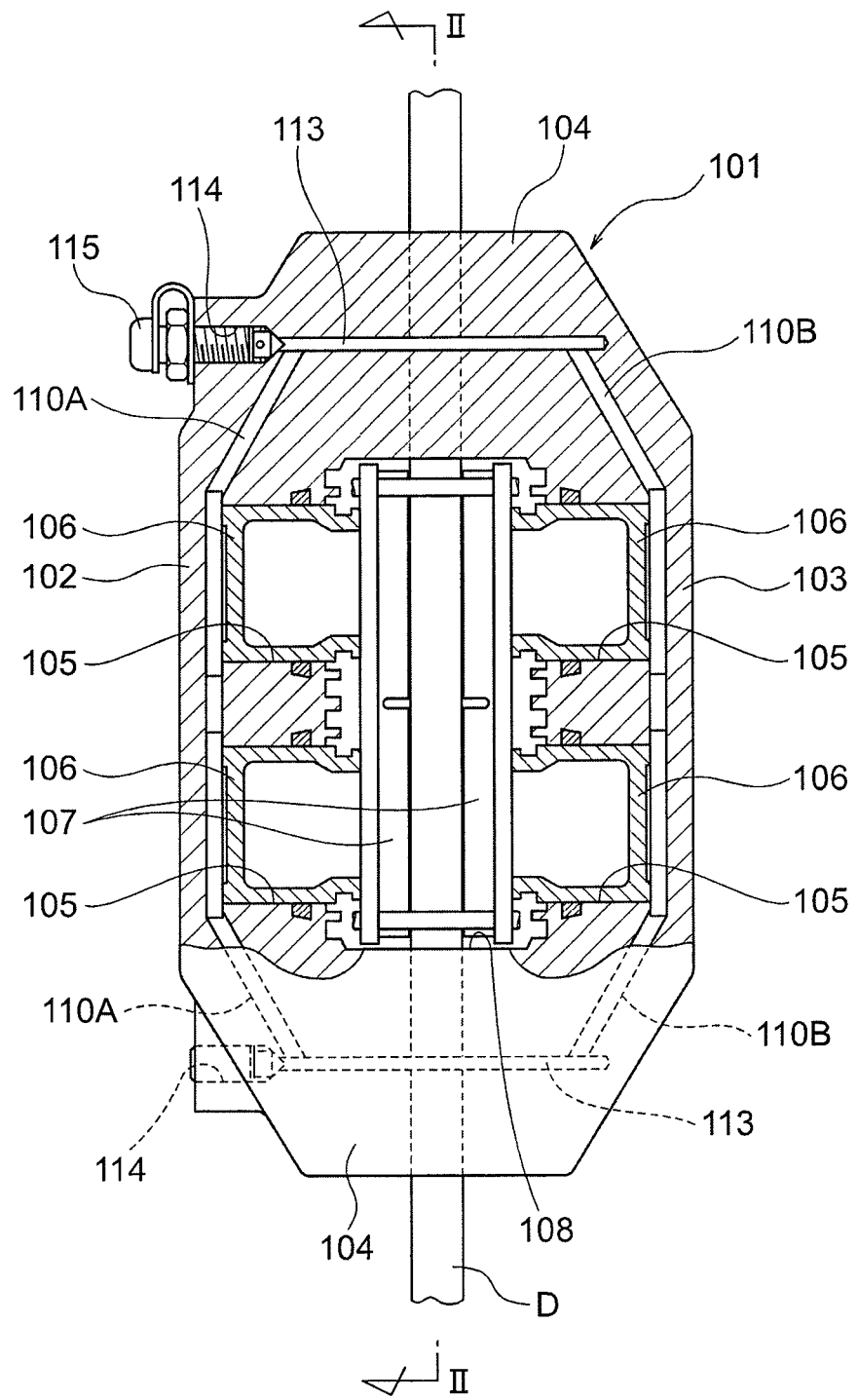
FIG. 18 is a fragmentary broken elevational view showing an existing piston-opposed type disc brake.
Figure 19:
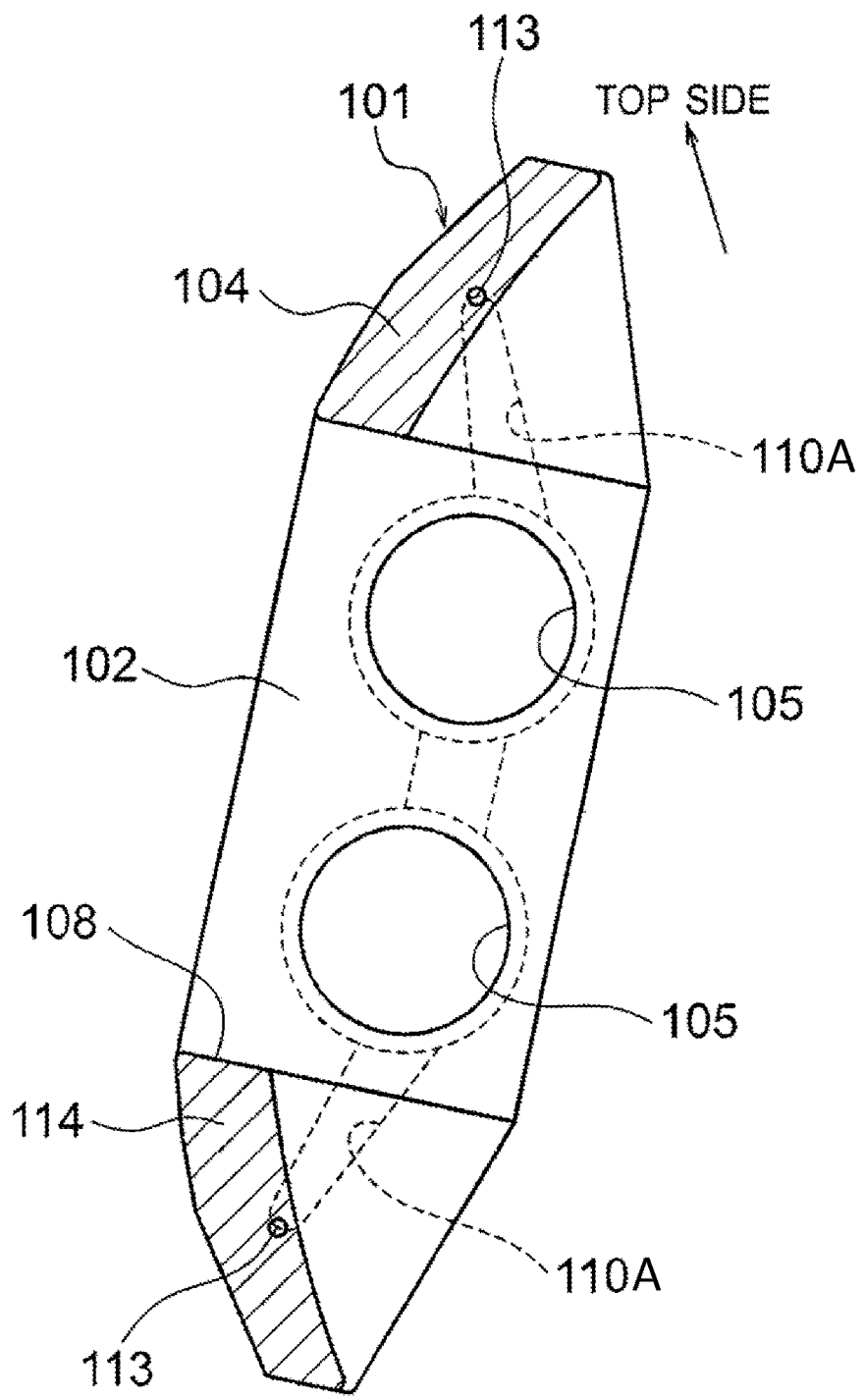
FIG. 19 is a sectional view taken along a line II-II shown in FIG. 18.

As a modification example of the core, a core 60 in a shape as shown in FIG. 17 may be used, for example. The core 60 is structured to be used in a case where the hydraulic linking channel is provided at the bridge sections 14 at two points as in the case of the caliper body 101 shown in FIG. 18 described as an example of the existing technique, for example, while the core 20 of the embodiment is the case where the hydraulic linking channel connecting section 26 for forming the hydraulic linking channel 18 (see FIG. 1 and the like) formed in one of the bridge sections 14 is provided.

That is, as shown in FIG. 17, a second hydraulic linking channel connecting section 26C is provided at a target position by sandwiching the main body section 21 with respect to having one hydraulic linking channel connecting section 26. Further, at both end parts of the second hydraulic linking channel connecting section 26C, respective top end parts of third connecting sections 23C, 24C for linking to the first connecting sections 23A, 24A are linked.

In FIG. 17, same reference numerals are applied to the components same as each of the components shown in FIG. 9.

Further, while the embodiment shows the core in which the main body section 21 and the cylinder forming projection sections 25 are connected and formed integrally, it is not essential to form the main body section 21 and the cylinder forming projection sections 25 integrally.

INDUSTRIAL APPLICABILITY

The present invention can be utilized for disc brakes used for executing braking of automobiles.

REFERENCE NUMERALS

10 Caliper for disk brake
12 Inner caliper section
13 Outer caliper section
14 Bridge section
14A Opposing surface
14B Disc groove
15 Hydraulic cylinder
16 Cylinder-side hydraulic channel
16A First channel
16B Second channel
17 Cylinder-side hydraulic channel
17A First channel
17B Second channel
18 Hydraulic linking channel
19 Bleeder hole
20 Core
22 Connecting channel forming section
23 Cylinder-side hydraulic channel connecting section
23A First connecting section
23B Second connecting section
24 Cylinder-side hydraulic linking channel connecting section
24A First connecting section
24B Second connecting section
25 Cylinder forming projection section
30 Mold
31 Inner periphery mold
32 Outer periphery mold
33 Sprue section
34 Riser section
40 Disc brake
S Inside space
K Connection point

What is claimed is:

1. A manufacturing method for a caliper for disc brakes, the caliper comprising: an inner caliper section and an outer caliper section which oppose each other and are configured to sandwich a disc rotor therebetween; the inner caliper section and the outer caliper section each include ends in respective length directions of each caliper section that are linked integrally via a bridge section; pressurizing piston hydraulic cylinders which are provided on respective opposing surface regions of the inner caliper section and the outer caliper section and are configured to simultaneously pressurize at least two surfaces of the disc rotor via brake pads; cylinder-side hydraulic channels provided on respective back face sides of the hydraulic cylinder provided on the inner caliper section and the hydraulic cylinder provided on the outer caliper section; a hydraulic linking channel provided inside the bridge section to link the cylinder-side hydraulic channels provided on the inner caliper section and the cylinder-side hydraulic channels provided on the outer caliper section, the method comprising:

generating a shell core and including a cylinder-side hydraulic channel connecting section and a hydraulic linking channel connecting section;

placing the core on a core supporting face of a mold;

molding the inner caliper section, the outer caliper section, and the bridge section by filling molten metal in cavities of the mold;

forming the cylinder-side hydraulic channels and the hydraulic linking channel by breaking down the core after the molten metal is cooled; and forming a bleeder hole, having an air bleeder attaching section, open from an outer surface side of the inner caliper section, and arranged towards the hydraulic linking channel.

2. The manufacturing method for a caliper for disc brakes as claimed in claim 1, wherein the generating of the core further includes:

providing a plurality of hydraulic cylinder forming projection sections for each of the inner caliper section and the outer caliper section; and providing a connecting channel forming section which connects the hydraulic cylinder forming projection sections to each other.

3. The manufacturing method for a caliper for disc brakes as claimed in claim 2, wherein the generating of the core further includes:

providing a connection knot section at a connection point between the cylinder-side hydraulic channel connecting section located on an inner caliper side and the hydraulic linking channel connecting section, the connection knot section including the connection point and protruding from the connection point.

4. The manufacturing method for a caliper for disc brakes as claimed in claim 1, wherein the generating of the core further includes:

providing a connection knot section at a connection point between the cylinder-side hydraulic channel connecting section located on an inner caliper side and the hydraulic linking channel connecting section, the connection knot section including the connection point and protruding from the connection point.

* * * * *